(12) United States Patent
Nakatani

(10) Patent No.: US 8,208,218 B2
(45) Date of Patent: Jun. 26, 2012

(54) BUFFER MEMBER, IMPACT ABSORBING DEVICE OF HARD DISK DRIVE, AND MOBILE INFORMATION APPARATUS USING IT

(75) Inventor: Hitoshi Nakatani, Osaka (JP)

(73) Assignee: Panasonic Corporation, Osaka (JP)

( * ) Notice: Subject to any disclaimer, the term of this patent is extended or adjusted under 35 U.S.C. 154(b) by 832 days.

(21) Appl. No.: 11/851,014

(22) Filed: Sep. 6, 2007

(65) Prior Publication Data

US 2008/0158712 A1    Jul. 3, 2008

(30) Foreign Application Priority Data

Dec. 28, 2006 (JP) ................. 2006-354293
Apr. 24, 2007 (JP) ................. 2007-113724

(51) Int. Cl.
*G11B 33/14* (2006.01)
(52) U.S. Cl. .................................. 360/97.02
(58) Field of Classification Search .......... 360/97.02, 360/97.01, 97.03, 97.04; 361/679.34, 679.35, 361/679.36, 679.37, 679.31, 679.33; 248/634, 248/636, 637; 312/223.2
See application file for complete search history.

(56) References Cited

U.S. PATENT DOCUMENTS

| | | | | |
|---|---|---|---|---|
| 5,216,582 A * | 6/1993 | Russell et al. | ........... | 361/679.34 |
| 5,463,527 A * | 10/1995 | Hager et al. | ............. | 361/679.34 |
| 6,274,217 B1 * | 8/2001 | Kim | ............................... | 428/131 |
| 6,915,903 B2 * | 7/2005 | Manuel et al. | ................ | 206/523 |
| 7,471,509 B1 * | 12/2008 | Oliver | ..................... | 361/679.33 |
| 2004/0190193 A1 * | 9/2004 | Kuwajima | ................. | 360/97.01 |

FOREIGN PATENT DOCUMENTS

| | | |
|---|---|---|
| JP | 2-205579 A | 8/1990 |
| JP | 11-242881 A | 9/1999 |
| JP | 2004-315087 A | 11/2004 |
| JP | 2006-342873 A | 12/2006 |

OTHER PUBLICATIONS

European Search Report (for EP 07 11 4768), Nov. 19, 2008.

* cited by examiner

*Primary Examiner* — Allen Cao
(74) *Attorney, Agent, or Firm* — RatnerPrestia

(57) ABSTRACT

A buffer member and impact absorbing device is formed of a soft flexible part that deforms compressively, has cushion performance, and has a substantially rectangular parallelepiped shape, and a sheet-like substrate part that has flexibility, is made of resin material, and has a substantially rectangular shape. A slit is formed by substantially vertically slotting the flexible part from its one surface to a midway so as to leave a surplus material part, and the substrate part is inserted and mounted to the slit formed in the flexible part. A relatively weak impact force is absorbed by the surplus material part of the flexible part, and a strong impact force that has not been completely absorbed by the surplus material part is absorbed by interaction between the flexible part and the substrate part.

17 Claims, 15 Drawing Sheets

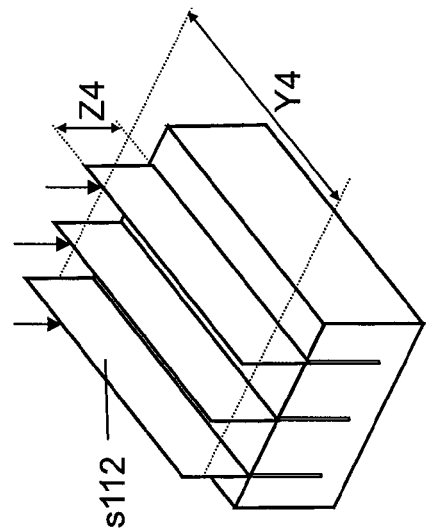
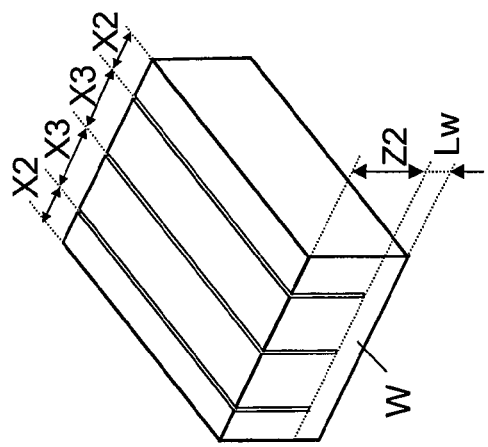
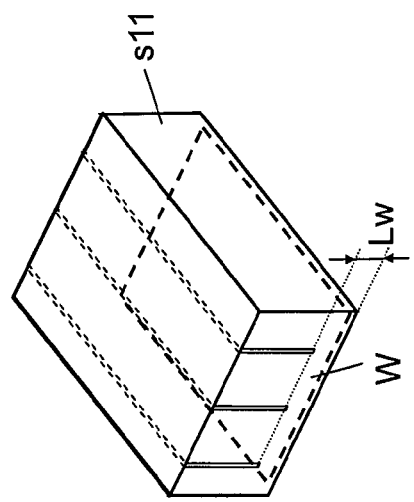
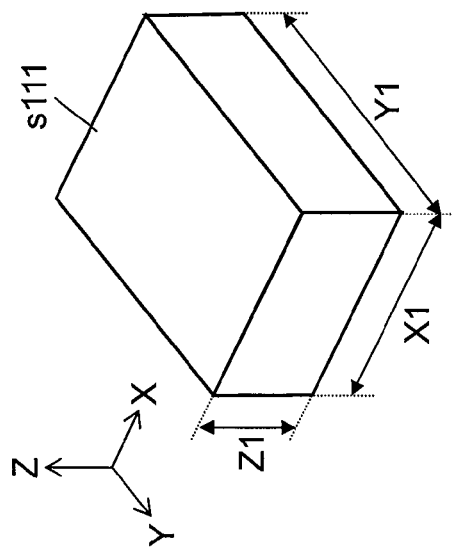
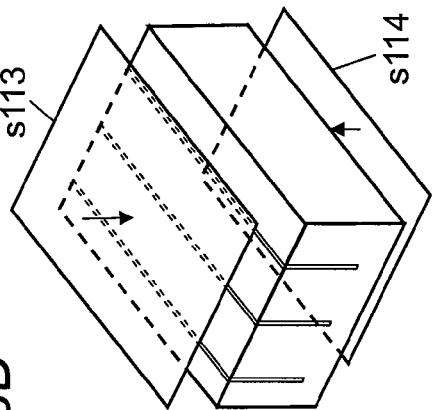

FIG. 10A
FIG. 10B
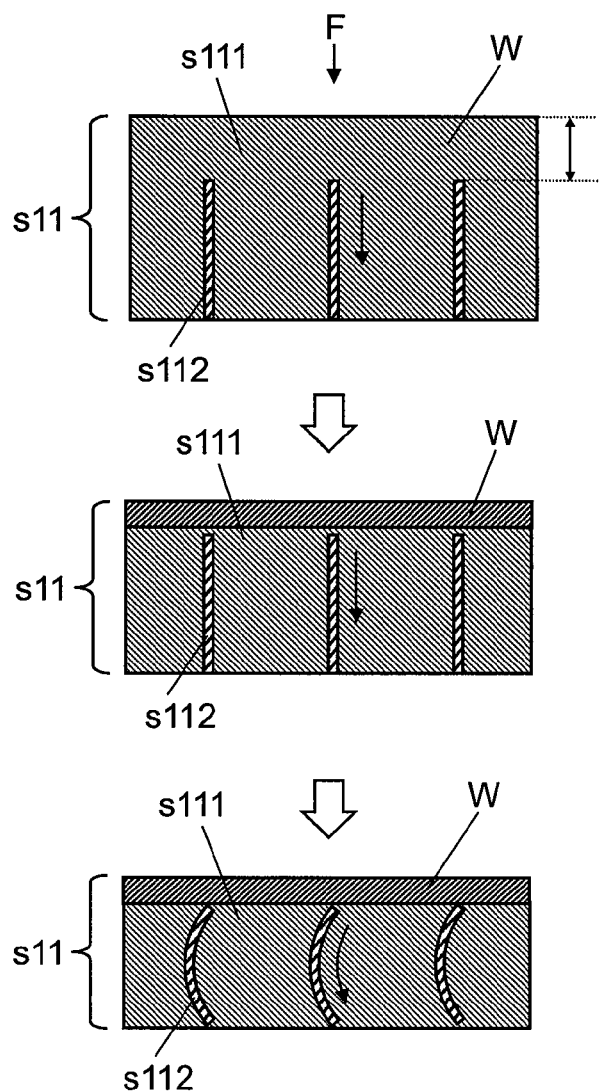
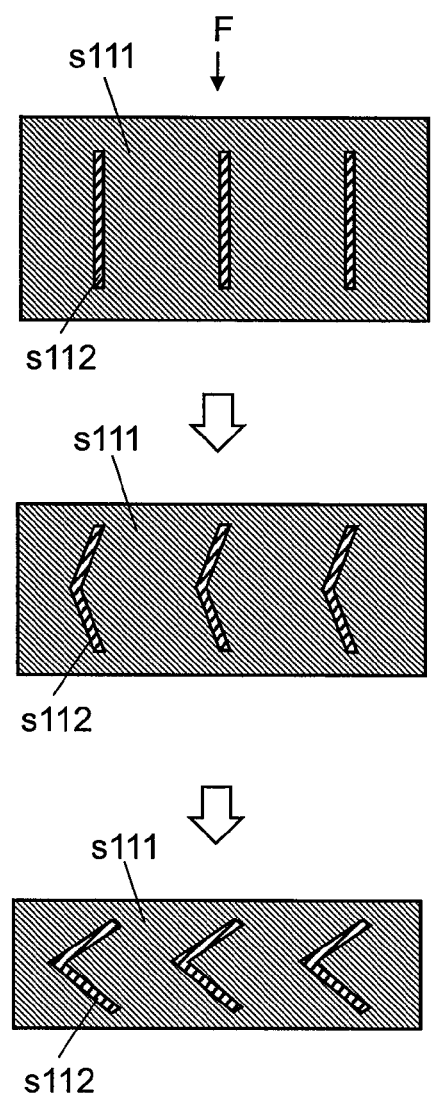

FIG. 11
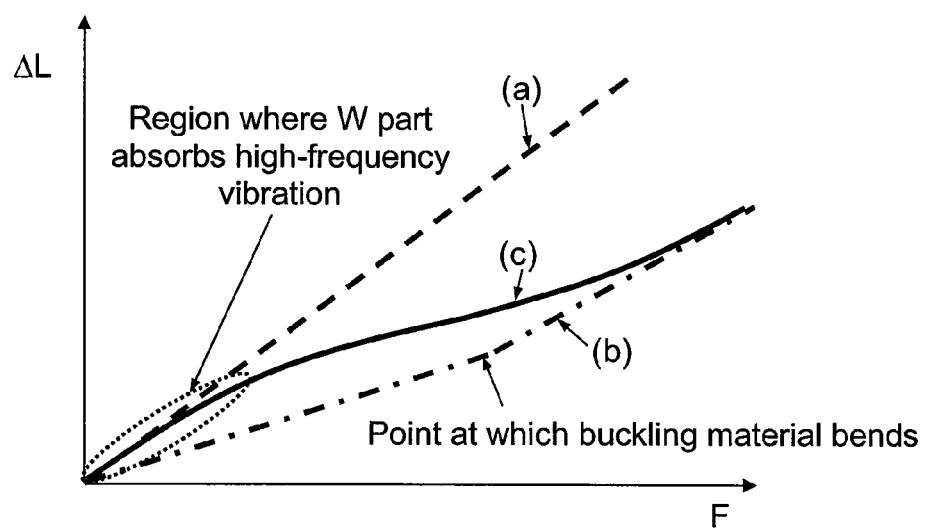
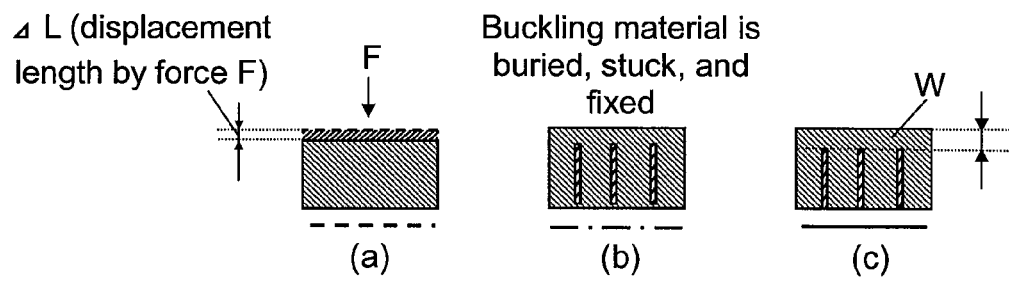

FIG. 13A
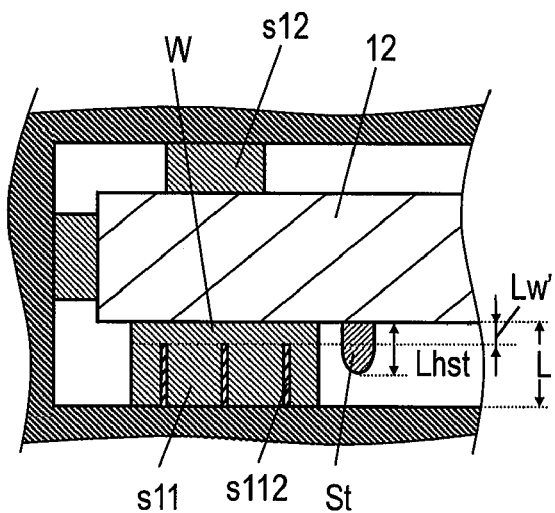
FIG. 13B
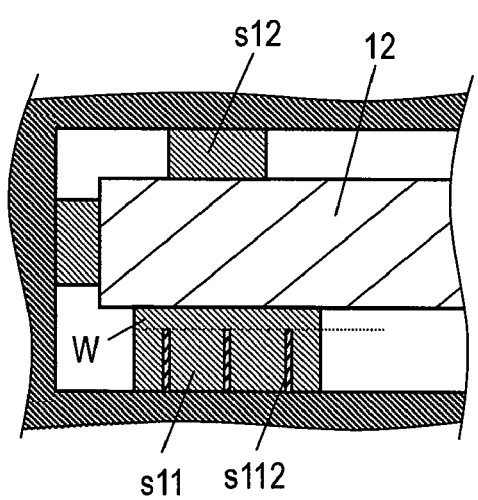
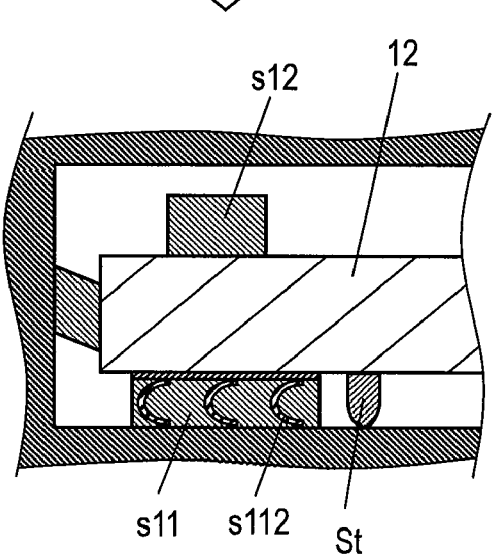
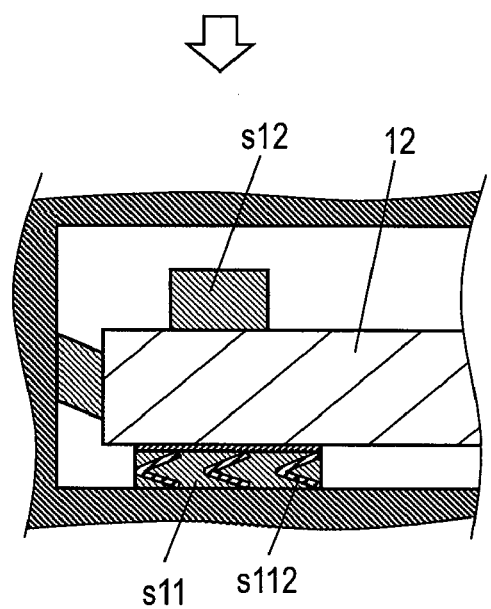

BUFFER MEMBER, IMPACT ABSORBING DEVICE OF HARD DISK DRIVE, AND MOBILE INFORMATION APPARATUS USING IT

BACKGROUND OF THE INVENTION

1. Field of the Invention

The present invention relates to a buffer member, and an impact absorbing device of a hard disk drive apt to be affected by an impact. More particularly, the present invention relates to a buffer member for protecting a hard disk drive against the impact occurring when a mobile information apparatus mounted with the hard disk drive falls, an impact absorbing device formed of the buffer member, and a mobile information apparatus having a built-in impact absorbing device storing a hard disk drive.

2. Background Art

A hard disk drive (hereinafter referred to as "HDD") moves a magnetic head in a head load state, and records or reproduces data at a target record position. In the head load state, the magnetic head keeps a predetermined distance (float spacing amount) from the surface of a disk rotating at a high speed. The float spacing amount between the magnetic head and the disk surface has decreased from year to year in order to increase the recording density of the HDD.

When the impact force is applied especially in the direction perpendicular to the disk surface during operation of the HDD, a phenomenon called head slap where the magnetic head displaces by the float spacing amount or longer to hit the disk surface is apt to occur. The head slap causes physical damage of the recording surface of the disk or the head. This damage disables recording or reproducing of data on at least the damaged part of the disk, and disables use of the whole recoding surface of the disk and breaks the HDD at worst.

When the HDD is mounted on a stationary information apparatus such as a desktop computer, an impact force as strong as the head slap is caused is hardly applied to the HDD. While, an HDD mounted on a mobile information apparatus such as a notebook personal computer (hereinafter referred to as "notebook PC") is always exposed to risk of receiving such an impact force. In other words, a user can easily carry or move a notebook PC due to its portability, but the user is accidentally apt to bump the notebook PC against a firm matter such as a corner of a desk or drop it during carrying or moving it. A notebook PC is produced to be light in weight and compact in order to secure the portability, so that such an impact force easily transfers to the built-in HDD to result in breakage of the HDD.

Therefore, a small HDD built in a notebook PC has been recently provided with a magnetic head evacuating function in order to increase the impact resistance especially during operation. In a 2.5-inch HDD, for example, in an idling state having no access demand for a certain time during either of non-operation and operation, the magnetic head is evacuated to a position separated from the disk by head unload operation. Here, in the head unload operation, the magnetic head is moved into a member for evacuation arranged at a position separated from the disk, and is locked at that position. Such an operation prevents an impact force serving perpendicularly to the recording surface of the disk from physically damaging the magnetic head or the dish surface.

In other words, when the magnetic head is not required to be positioned on the recording surface of the disk of the HDD dependently on the operation mode, the head is evacuated from the disk to prevent the head slap.

During access operation (access operation of the HDD) of the magnetic head to the disk, however, the magnetic head lies in the head load state as a matter of course. A perpendicular impact force causes the head slap to damage the disk. In other words, the possibility that an impact force perpendicular to the disk surface causes the head slap to damage the disk during access operation of the HDD is kept high. Therefore, the HDD cannot be protected against an impact caused when the user accidentally bumps the notebook PC against a firm matter or drops it during access operation of the HDD. A weak impact applied to the HDD by daily handling and repetitive vibration of high frequency damages the HDD or disk surface. Here, an example of the daily handling is putting the notebook PC on a desk or carrying the notebook PC with a bag. A conventional buffer member used in an electronic apparatus such as a HDD and a mounting structure to the electronic apparatus are described hereinafter with reference to the drawings.

FIG. 14 is a schematic perspective view of a built-in electronic apparatus via a conventional buffer member. When an impact such as drop is applied to electronic apparatus 10, buffer member 31 mounted to each of four corners of electronic apparatus 10 reduces the impact force applied to the electronic apparatus 10 body.

A buffer member formed by combining a plurality of materials of a different impact buffering characteristic is proposed.

FIG. 15 is a schematic front view showing an example where a buffer member that is formed of a plurality of members and absorbs vibration and impact is disposed between electronic apparatus 10 and a storage part (not shown) of electronic apparatus 10.

In FIG. 15, the buffer member is formed of first buffer member 41 of high compressive elasticity modulus and second buffer member 42 of low compressive elasticity modulus. The buffer member has a two-stage structure as below. When a weak impact is applied to electronic apparatus 10, only soft second buffer member 42 softly absorbs the impact. When a strong impact is further applied to electronic apparatus 10, the impact that cannot be completely absorbed by soft second buffer member 42 is absorbed by newly added hard first buffer member 41. Therefore, each of the first and second buffer members absorbs the impact by each elastic deformation. This structure can reduce various impacts, namely from a weak impact to a strong impact, more effectively than a single buffer member.

An example of the conventional art document information related to this technology is Japanese Patent Unexamined Publication No. H11-242881.

As long as the impact is absorbed simply by elastic deformation, however, it is considered to be difficult that the buffer member and impact buffering method of FIG. 15 effectively reduce the impact force to prevent the electronic apparatus body from being fatally damaged.

FIG. 16 is a schematic front view showing an example of a conventional buffer member that is formed of a complex member having sheet-like second buffer material 52 in first buffer material 51 and is unitarily molded.

When an impact is applied to electronic apparatus 10, this buffer member absorbs the impact by bending of buffer material 52 and then absorbs the impact by buckling of a bending part. Therefore, the buffer member can receive impact compressive force for a relatively long time, and can sufficiently exhibit the buffer performance.

An example of the conventional art document information related to this technology is Japanese Patent Unexamined Publication No. 2004-315087.

In the buffer member and impact buffering method of FIG. 16, however, sheet-like second buffer material 52 does not bend and does not exhibit the buffer effect when the impact is weak. Electronic apparatus 10 propagates generated high-frequency vibration to the product case that stores electronic apparatus 10 via sheet-like second buffer material 52. When a notebook PC is used, the vibration of the hard disk device is propagated to the case side, namely to the case part of the notebook PC touched by the user. This is a problem about the product quality.

FIG. 17 is a schematic perspective view showing a conventional example of combination of buffer materials in a packing material.

In this example, also, a plurality of buffer materials are unitarily molded and buckling material 62 buried in buffer material 61 is buckled, thereby improving the buffer performance. Buckling material 62 is molded unitarily with buffer material 61. Buckling material 62 is set shorter than buffer material 61 in the thickness direction to prevent a packed object from being damaged.

An example of the conventional art document information related to this technology is Japanese Patent Unexamined Publication No. H02-205579.

However, also in the example of FIG. 17, the unitary molding of the buffer material and buckling material causes the impact to be propagated through the buckling material similarly to the example of FIG. 16.

SUMMARY OF THE INVENTION

The present invention addresses the conventional problems, and provides a buffer member and impact absorbing device capable of buffering various impacts, namely from an extremely strong impact such as falling to a weak impact by daily handling and repetitive vibration.

The buffer member of the present invention is formed of soft first buffer material (flexible part) that deforms compressively, has cushion performance, and has a substantially rectangular parallelepiped shape, and a sheet-like second buffer material (substrate part) that has flexibility, is made of resin material, and has a substantially rectangular shape. This buffer member is a complex member formed by the following processes:

forming a slit by slotting the first buffer material from one surface thereof to a midway substantially vertically; and inserting and mounting the second buffer material into the slit formed in the first buffer material.

In this structure, a relatively weak impact force is absorbed by a surplus material part having no slit in the flexible part, and a stronger impact force that has not been completely absorbed by the flexible part is absorbed by interaction between the flexible part and the substrate part. Therefore, the buffer effect against various impacts, namely from a strong impact caused when a user accidentally drops a notebook PC, for example, to a daily weak impact caused when the user puts the notebook PC on a desk or carries it with a bag.

BRIEF DESCRIPTION OF DRAWINGS

FIG. 6A is a perspective view of a flexible part before processing for showing the structure and assembling procedure of the buffer member.

FIG. 6B is a perspective view of the flexible part after forming a slit for showing the structure and assembling procedure of the buffer member.

FIG. 6C is a perspective view of the flexible part in inserting a substrate part for showing the structure and assembling procedure of the buffer member.

FIG. 6D is a perspective view of the flexible part in sticking adhesive tape for showing the structure and assembling procedure of the buffer member.

FIG. 6E is a perspective view of the buffer member at the completion thereof for showing the structure and assembling procedure of the buffer member.

FIG. 10A is a schematic sectional view showing the deformation state of the substrate part and flexible part when a load is applied from the upside in the case where the substrate part is not fixed to the flexible part.

FIG. 10B is a schematic sectional view showing the deformation state of the substrate part and flexible part when a load is applied from the upside in the case where the substrate part is fixed to the flexible part.

FIG. 11 is a graph showing deformation amount ΔL when a load is applied from the upside to each of a buffer member having only the flexible part, a buffer member where the substrate part is buried in the flexible part and the boundary surfaces are stuck and fixed to each other, and a buffer member where the substrate part is inserted into the slit in the flexible part and the boundary surfaces are not fixed to each other.

FIG. 13A is a schematic sectional view of the HDD unit stored in the case for illustrating the buffer operation performed when an impact is applied from the downside to the impact absorbing device storing an HDD of a second exemplary embodiment.

FIG. 13B is a schematic sectional view of the HDD unit stored in the case for illustrating the buffer operation performed when an impact is applied from the downside to the impact absorbing device storing an HDD of a first exemplary embodiment.

DETAILED DESCRIPTION OF THE INVENTION

Exemplary embodiments of the present invention will be described with reference to FIG. 1 through FIG. 13B.

First Exemplary Embodiment

Figure 1:
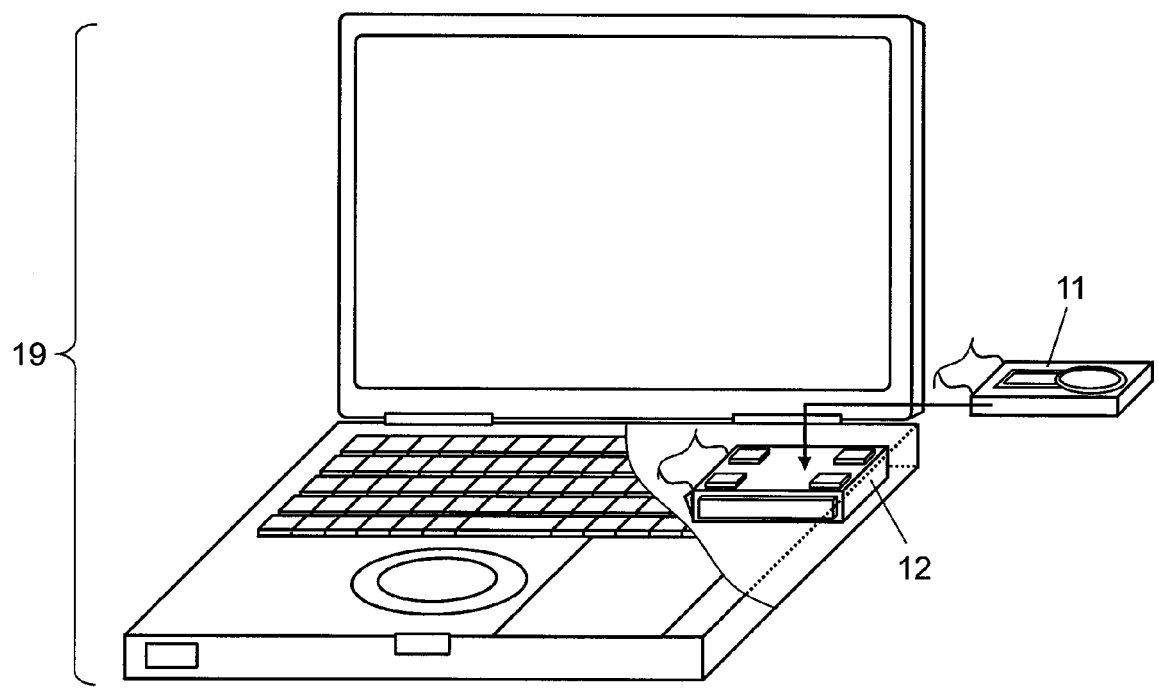
FIG. 1 is a schematic exploded perspective view showing an example where a hard-disk-drive impact absorbing device is built in a notebook PC in accordance with the present invention.

FIG. 1 is a schematic exploded perspective view showing an example where an impact absorbing device of a hard disk drive is built in a notebook PC in accordance with the present invention. HDD 11 is covered with and mounted in impact absorbing device 12. HDD 11 and impact absorbing device 12 are mounted in notebook PC 19.

Impact absorbing device 12 is the first exemplary embodiment of the impact absorbing device of the present invention. Notebook PC 19 is the first exemplary embodiment of the mobile information apparatus using the impact absorbing device of the present invention.

Figure 2:
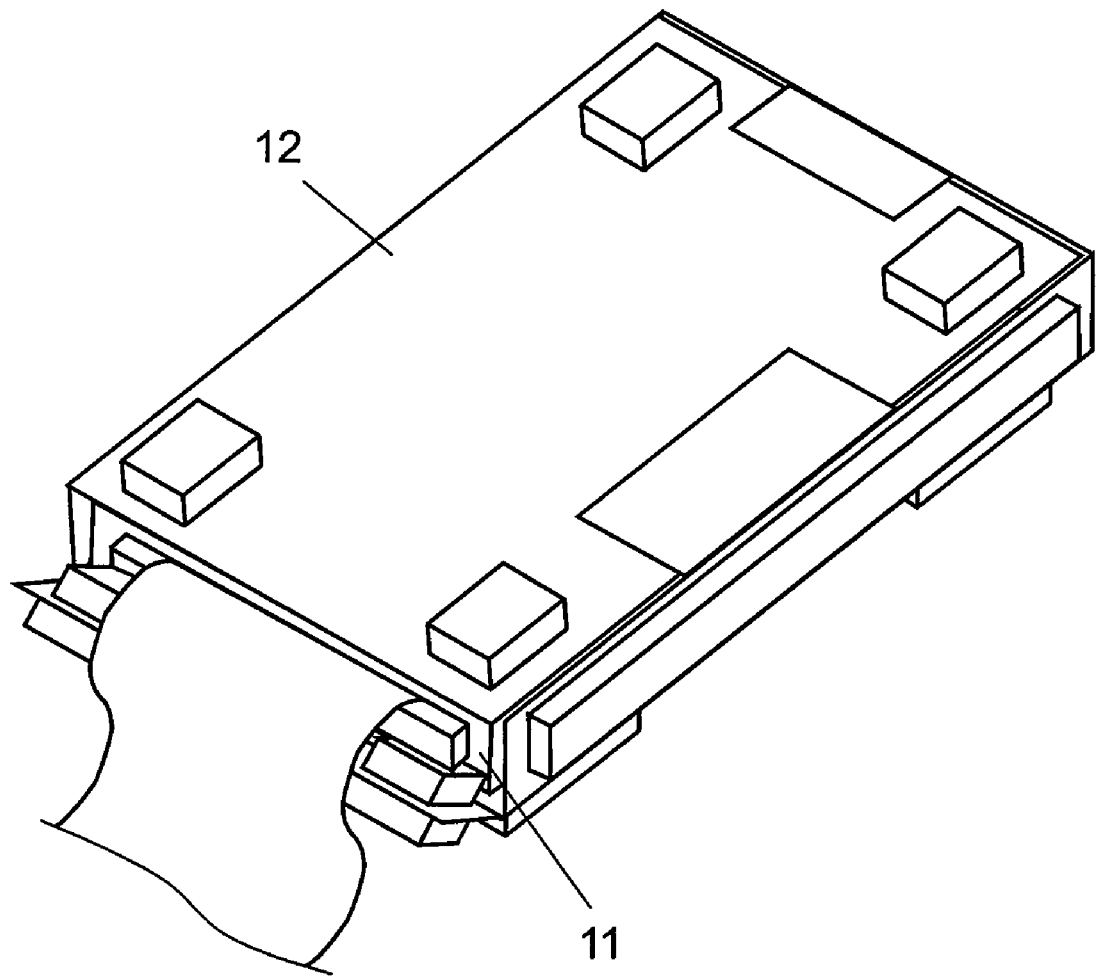
FIG. 2 is a schematic perspective view showing an HDD covered with and mounted in the impact absorbing device.

FIG. 2 is a schematic perspective view showing HDD 11 covered with and mounted in impact absorbing device 12.

In FIG. 2, the state where HDD 11 is mounted in impact absorbing device 12 is enlarged. HDD 11 is mounted in the notebook PC in this state.

Figure 3:
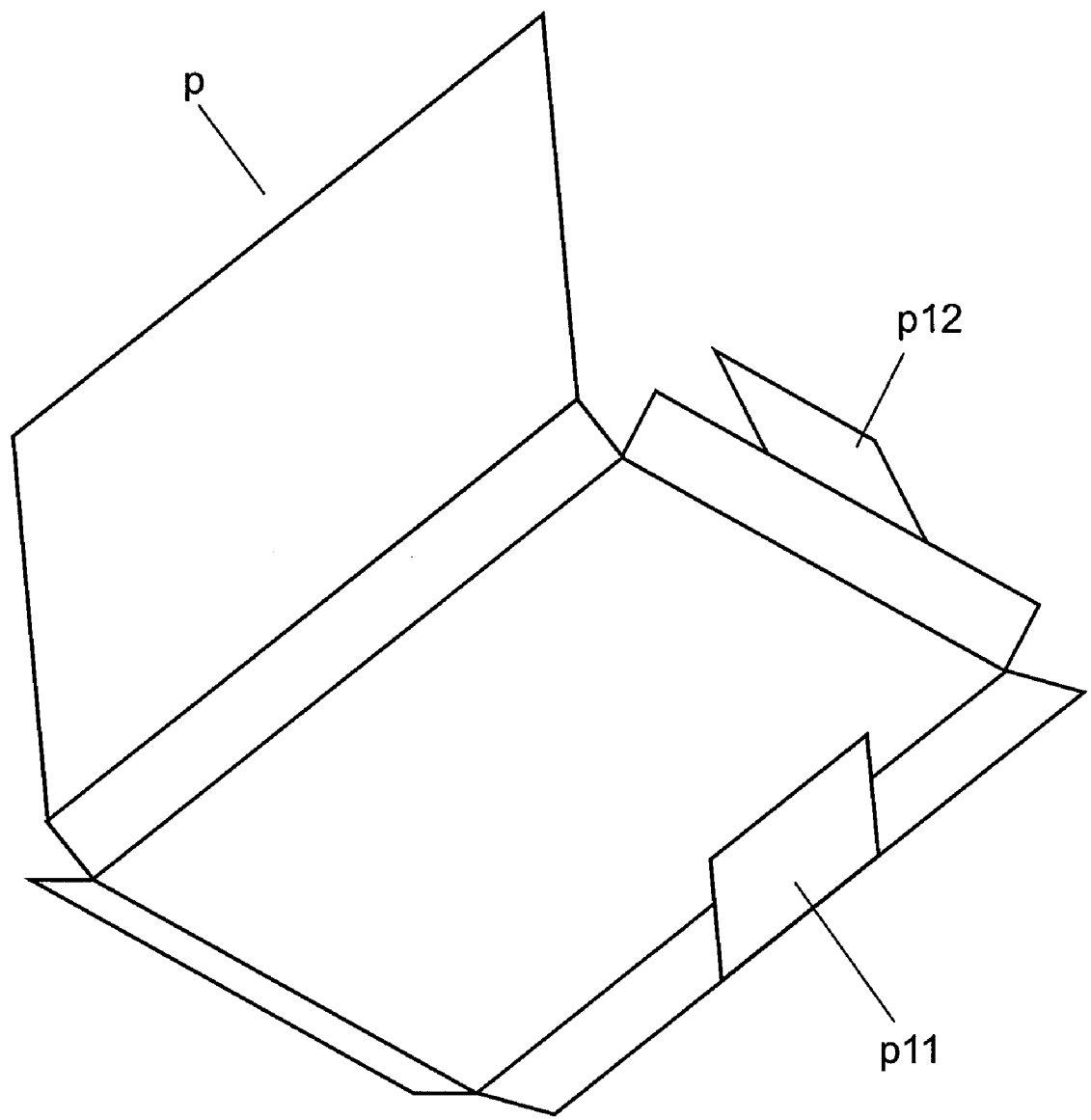
FIG. 3 is a schematic perspective view of a packaging material for showing a procedure of assembling the impact absorbing device and mounting the HDD.
Figure 4:
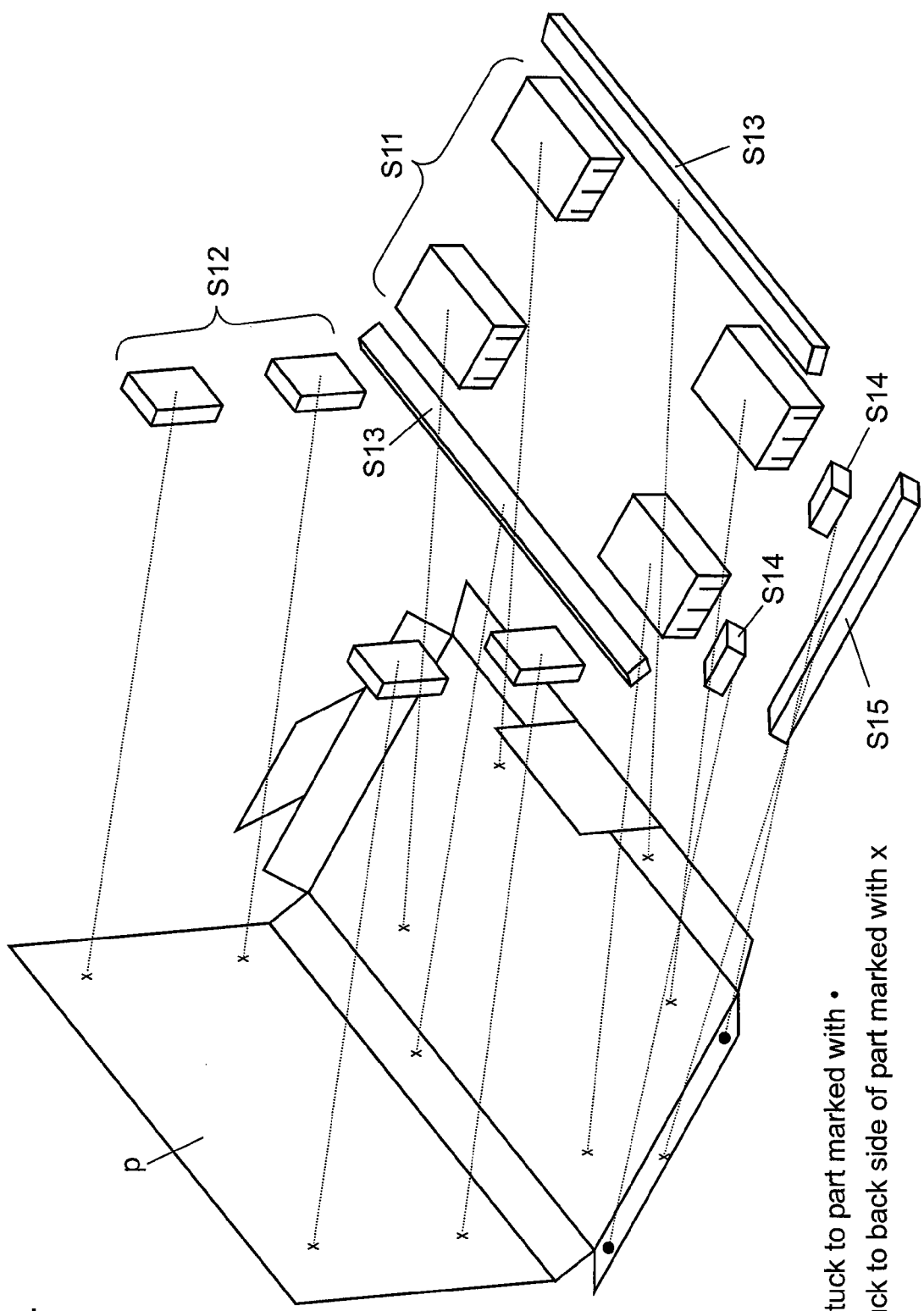
FIG. 4 is a schematic exploded perspective view of the impact absorbing device for showing the procedure of assembling the impact absorbing device and mounting the HDD.
Figure 5:
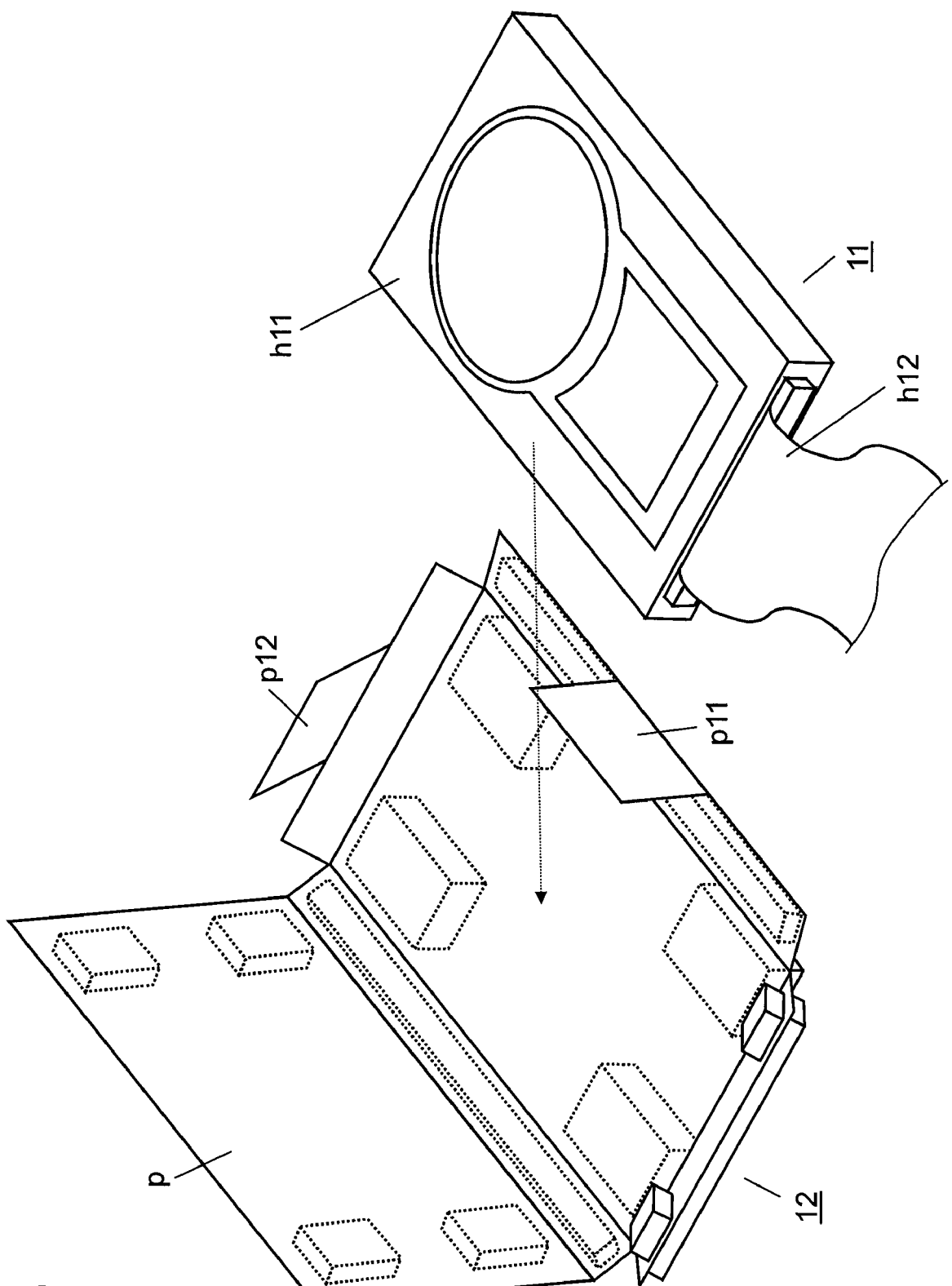
FIG. 5 is a schematic exploded perspective view of an HDD unit for showing the procedure of assembling the impact absorbing device and mounting the HDD.

FIG. 3 through FIG. 5 are schematic perspective view and schematic exploded perspective view showing a procedure of assembling impact absorbing device 12 and mounting HDD 11.

In FIG. 4 and FIG. 5, impact absorbing device 12 has a set of four buffer members s11, a set of four buffer members s12, a set of two buffer members s13, a set of two buffer members s14, and one buffer member s15. Packing material (p) is a thin sheet material made of resin, is cut as shown in FIG. 3, and is folded and molded. A device weak to an impact such as an HDD is stored in a space formed by folding.

HDD 11 of FIG. 5 has HDD body h11 and cable unit h12. Cable unit h12 is formed of a connector and a flat cable that are used for transmitting or receiving signals of driving, recording or reproducing data of the HDD.

FIG. 6A through FIG. 6E are perspective views showing the structure and assembling procedure of each buffer member s11.

In FIG. 6A through FIG. 6E, buffer member s11 has the following parts:
  soft flexible part (first buffer material) s111 that is compressively deformed by pressing, namely has cushion performance, and has a substantially rectangular parallelepiped shape whose width is X1, longitudinal length is Y1, and thickness is Z1;
  sheet-like substrate part (second buffer material) s112 that has flexibility, is made of resin material, and has a substantially rectangular shape whose longitudinal length is Y4 and width is Z4;
  adhesive tape s113 for preventing substrate part s112 from dropping from the slit in flexible part s111; and
  adhesive double coated tape s114 for sticking buffer member s11 to packing material (p).

Flexible part s111 is made of cushion material such as urethane foamed material, and substrate part s112 is made of sheet material such as general polyethylene.

Buffer members s12 through s15 other than buffer member s11 shown in FIG. 4 are formed of only flexible part s111 and adhesive double coated tape s114.

A procedure of assembling the impact absorbing device of the present invention and mounting the HDD is described hereinafter in detail with reference to FIG. 2 through FIG. 5.

First, buffer members s11 through s15 are stuck and fixed to surfaces of packing material (p) of FIG. 3 with adhesive double coated tape s114 as shown in FIG. 4. Buffer members s11 through s15 are stuck to the points marked with x on the rear side of packing material (p) of FIG. 4, and to the points marked with ● on the front side thereof, thereby completing impact absorbing device 12.

Next, as shown in FIG. 5, HDD 11 is stored in the space formed by folding packing material (p), and tongue parts p11 and p12 of packing material (p) are retained by adhesive double coated tape or the like. Thus, the HDD unit shown in FIG. 2 is completed where HDD 11 is covered with and stored in impact absorbing device 12.

HDD 11 is weak to an impact in the direction perpendicular to the disk surface mounted inside. Therefore, preferably, buffer members s11 are stuck to the surface of packing material (p) corresponding to a surface parallel to the disk surface of HDD 11 using adhesive double coated tape s114.

A procedure of assembling buffer member s11 is described hereinafter with reference to FIG. 6A through FIG. 6E.

The block of flexible part s111 of FIG. 6A is slotted substantially perpendicularly to one surface thereof from this surface to not the opposite surface but a midway so as to leave the surplus material part (corresponding to length Lw), as shown in FIG. 6B. In FIG. 6B, the block is slotted from the X-Y face, substantially vertically, in the longitudinal Y direction, at substantially regular intervals in the width X direction, in parallel with the Y-Z face, and to depth Z2, so as to leave surplus material part W (length Lw), thereby forming a plurality of slits (three slits in FIG. 6B). In FIG. 6C, substrate parts s112 cut in a substantially rectangular shape are inserted into the formed slits. Finally, in FIG. 6D, adhesive tape s113 for preventing substrate parts s112 from dropping is stuck so as to cover the cut ends of the slits in flexible part s111, and adhesive double coated tape s114 for fixing buffer member s11 to packing material (p) is stuck to the side opposite to the surface having cut ends of the slits, thereby completing buffer member s11 of FIG. 6E.

In FIG. 6C, only by inserting substrate parts s112 into the slits formed in flexible part s111, substrate parts s112 are installed slidably on the boundary surfaces between flexible part s111 and substrate parts s112 without being fixed through an adhesive or the like. Substrate parts s112 are preferably protected against moisture adhesion so that they easily slide on the boundary surfaces between flexible part s111 and substrate parts s112.

Width Z4 of substrate parts s112 corresponding to the slit depth is equal to depth Z2=Z1−Lw of the slits in flexible part s111 or shorter than it (Z4≦Z2=Z1−Lw) so that substrate parts s112 are completely inserted and stored in the slits. Substrate parts s112 are previously cut so that longitudinal size Y4 is substantially equal to longitudinal size Y1 of flexible part s111. Flexible part s111 is slotted so that the slit intervals in flexible part s111 are X2 between each end of flexible part s111 in the X direction and the slit closest to it, and X3 between slits adjacent to each other. In other words, the size between each end in the X direction and the slit closest to it is constant, and the size between slits adjacent to each other is constant.

The number of slits is not required to be plural, but may be one. Further, the number of slits is not limited to three, but may be more than three or less than three.

Buffering operation of the buffer member and impact absorbing device of the present invention is described hereinafter with reference to FIG. 7A through FIG. 11.

FIG. 7A through FIG. 7D are schematic sectional views illustrating the buffering operation performed when an impact is applied from the downside to impact absorbing device 12 storing HDD 11. This operation corresponds to dropping of the notebook PC of FIG. 1.

Figure 7A:
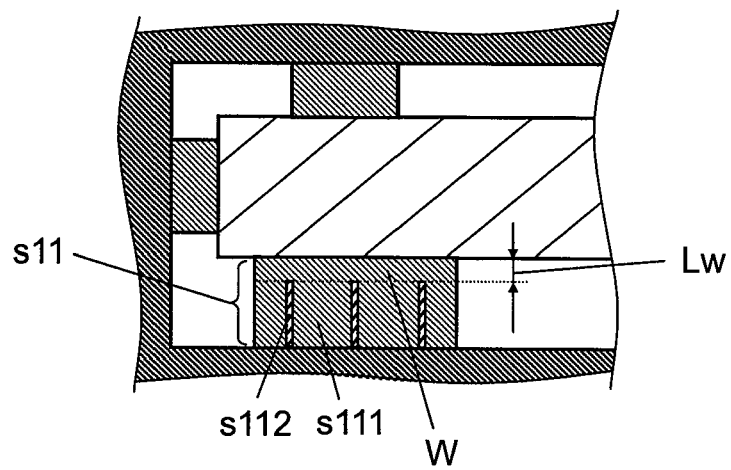
FIG. 7A is a schematic sectional view of the impact absorbing device before applying an impact to it from its downside.
Figure 7B:
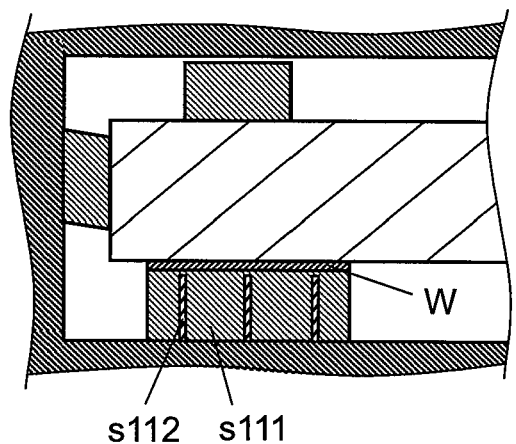
FIG. 7B is a schematic sectional view of the impact absorbing device in applying a weak impact to it from its downside.

FIG. 7A is a schematic sectional view of the HDD unit stored in the case before applying the impact. When the impact is applied from the downside, surplus material part W of soft flexible part s111 of buffer member s11 is firstly compressed significantly, as shown in FIG. 7B. When any more impact force is not applied, the buffer members including buffer member s11 return from this state to the original state of FIG. 7A.

Figure 7C:
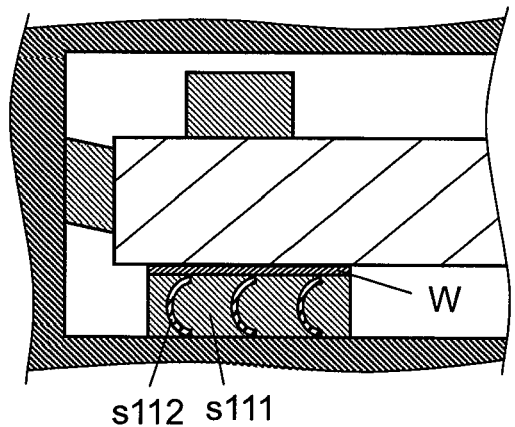
FIG. 7C is a schematic sectional view of the impact absorbing device in applying a strong impact to it from its downside.
Figure 7D:
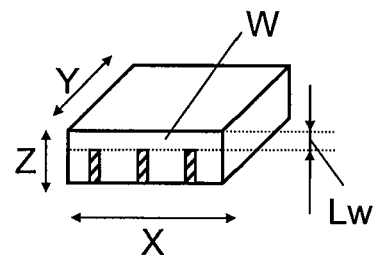
FIG. 7D is a schematic perspective view of the buffer member.

When a stronger impact force is applied from the downside of buffer member s11 in the state of FIG. 7B, the impact force that has not been completely absorbed by surplus material part W is absorbed by interaction between flexible part s111 and substrate parts s112 as shown in FIG. 7C. In other words, substrate parts s112 bend and deform, and flexible part s111 supports substrate parts s112 from their peripheries so that substrate parts s112 is not folded. Thus, a relatively weak impact force is absorbed by surplus material part W of flexible part s111, and a stronger impact force that has not been completely absorbed by surplus material part W is absorbed by interaction between flexible part s111 and substrate parts s112. FIG. 7D is a schematic perspective view of buffer member s11, X shows the width direction of the buffer member, Y shows the longitudinal direction of the buffer member, Z shows the thickness direction of the buffer member, and Lw shows the thickness of surplus material part W.

Another effect of surplus material part W of buffer member s11 is described hereinafter with reference to FIG. 8A through FIG. 9B.

Since surplus material part W is left without inserting slits into the flexible part s111 made of soft material in the whole thickness direction (corresponding to Z1), vibration that propagates from the case of the notebook PC, has high frequency, and is hazardous to HDD 11 can be blocked. While, vibration on the side of operating HDD 11 can be prevented from propagating to the side of the notebook PC case.

Figure 8A:
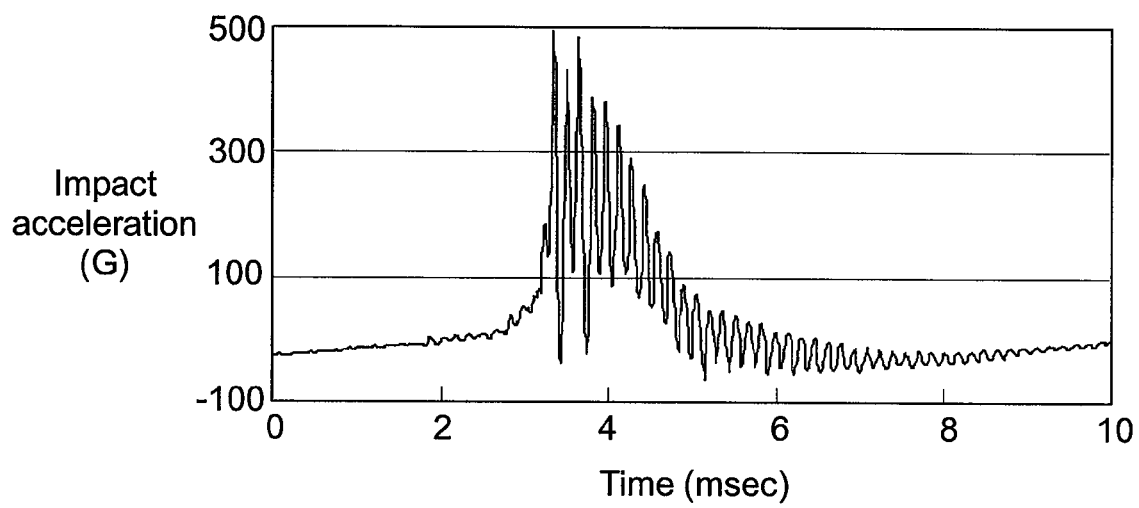
FIG. 8A is a graph showing impact waveform propagating to the HDD when the flexible part has no surplus material part.
Figure 8B:
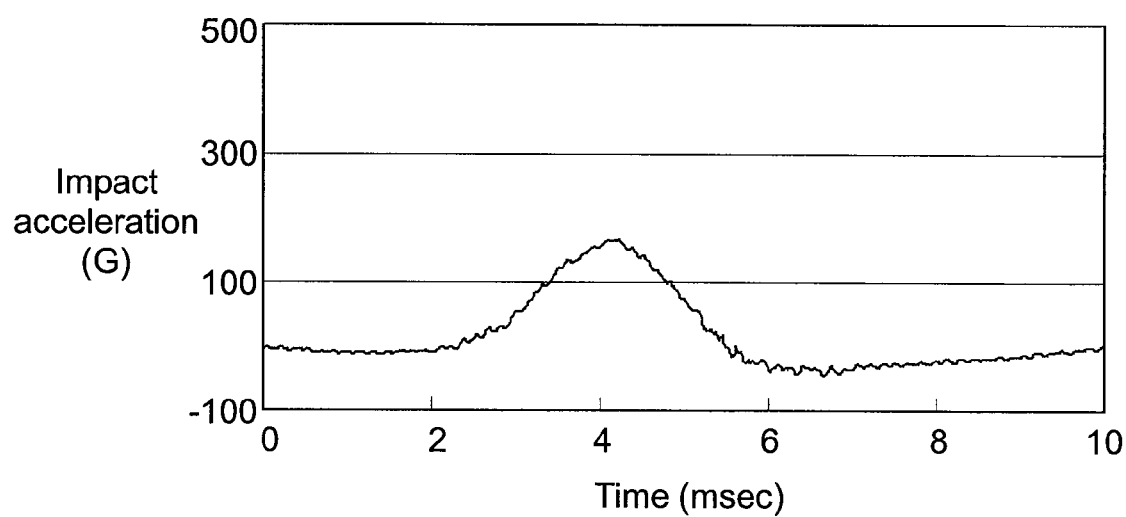
FIG. 8B is a graph showing impact waveform propagating to the HDD when the flexible part has a surplus material part.

FIG. 8A is a graph showing impact waveform propagating to HDD 11 when flexible part s111 has no surplus material part W. FIG. 8B is a graph showing impact waveform propagating to HDD 11 when flexible part s111 has surplus material part W. FIG. 8B shows that surplus material part W blocks high-frequency impact, and illustrates the effectiveness of surplus material part W.

Figure 9A:
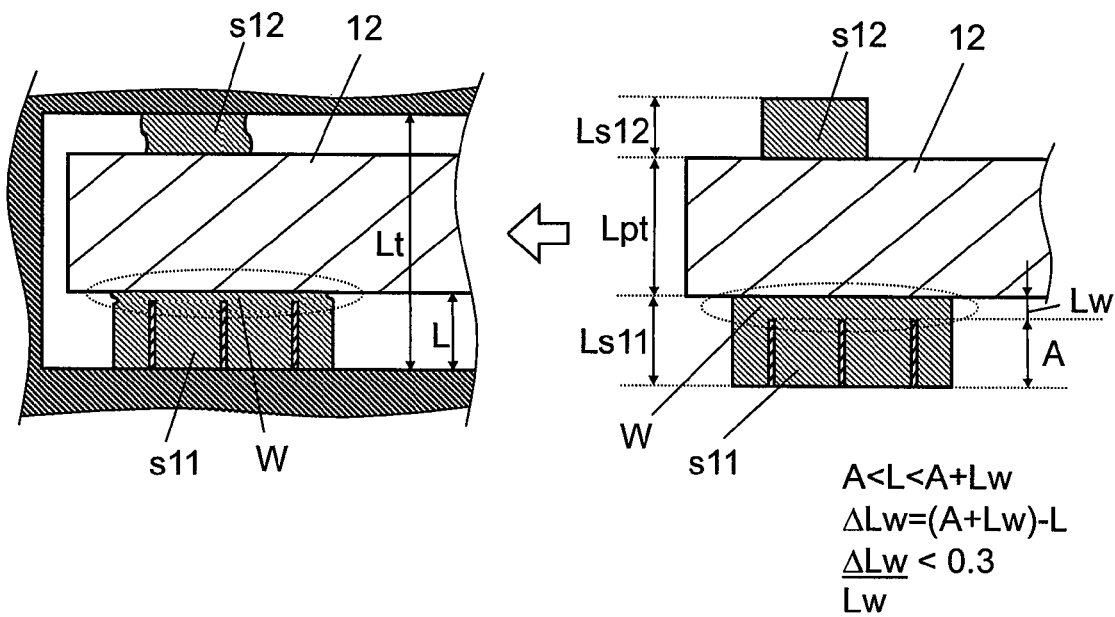
FIG. 9A is a schematic sectional view showing detail of the buffer member having a surplus material part when the impact absorbing device is stored in the notebook PC case.
Figure 9B:
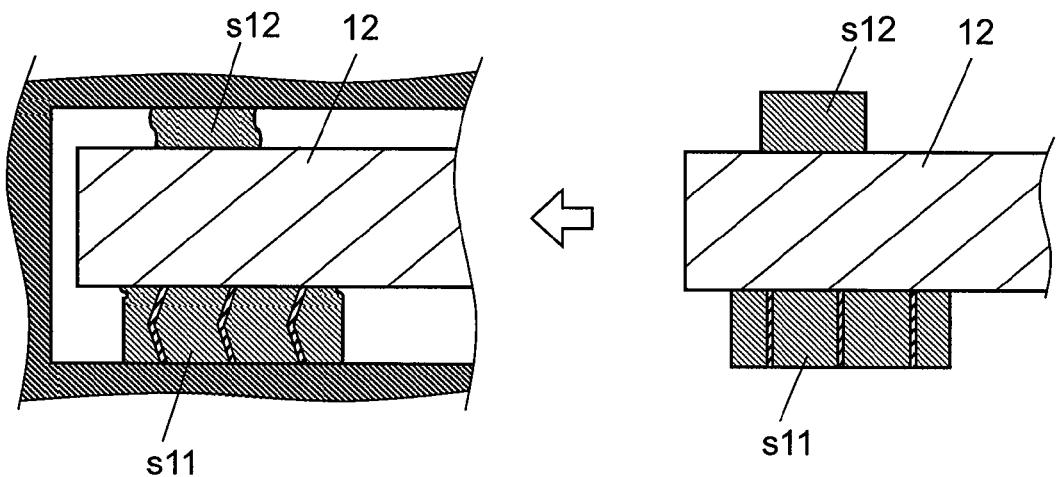
FIG. 9B is a schematic sectional view showing detail of the buffer member having no surplus material part when the impact absorbing device is stored in the notebook PC case.

FIG. 9A and FIG. 9B are schematic sectional views showing detail of the buffer member when the impact absorbing device is stored in the notebook PC case. Buffer member s11 has surplus material part W in FIG. 9A, and buffer member s11 has no surplus material part in FIG. 9B. FIG. 9A is compared with FIG. 9B.

When impact absorbing device 12 storing HDD 11 is installed in a storage space of the notebook PC with predetermined height Lt, it is preferable to establish relationship "Ls11+Lpt+Ls12≧Lt".

Here, Ls11 is the thickness of buffer member s11 (the same as Z1 of FIG. 6A), Lpt is the size in the thickness direction of impact absorbing device 12 formed by assembling packing material (p) for storing HDD 11, and Ls12 is the thickness of buffer member s12.

Conversely, when relationship "Ls11+Lpt+Ls12<Lt" is established, impact absorbing device 12 slides and moves on the storage space in the notebook PC case if it is not fixed by any method. In other words, the height of impact absorbing device 12 and thickness of buffer members are set so that the sum of them is slightly more than the height of the storage space in the notebook PC. When buffer member s11 has no surplus material part W, buffer member s11 is stored in the storage space with substrate parts s112 bent, as shown in FIG. 9B. This state is similar to that of FIG. 7C. Though no impact force is applied, substrate parts s112 are bent or buckled as if the impact force were applied, the impact force absorbing capacity is damaged.

When impact absorbing device 12 having surplus material part W in buffer member s11 is stored in the notebook PC case, preferably, various parameters of buffer member s11 establish "A<L<A+Lw" and "ΔLw/Lw<0.3", where ΔLw is (A+Lw)−L.

Here, A is the length of the side of substrate parts s112 corresponding to the depth of the slits formed in flexible part s111 (the same as Z4 of FIG. 6C). L is the length (distance) between the end of the notebook PC case on which buffer member s11 abuts and the surface of packing material (p) to which buffer member s11 is stuck. Lw is the original size (thickness) of surplus material part W before mounting (compressing) the impact absorbing device to the notebook PC. ΔLw is the size (thickness) of surplus material part W compressed when the impact absorbing device is stored in the notebook PC.

In other words, the compressed ratio of surplus material part W by storing impact absorbing device 12 in the notebook PC case is set lower than 0.3, thereby sufficiently exhibiting effects such as Effect 1 through Effect 3.

(Effect 1) When impact absorbing device 12 is stored in a predetermined space in the notebook PC case, the impact force absorbing capacity thereof can be used to the full without bending substrate parts s112.

(Effect 2) Hazardous vibration can be effectively protected from an HDD to which high frequency propagates from the notebook PC case.

(Effect 3) The impact absorbing device can be stably and certainly stored in the predetermined space in the notebook PC case without using a fixing means.

In the description of FIG. 6C, the following contents have been described. Only by inserting substrate parts s112 into the slits formed in flexible part s111, substrate parts s112 are installed slidably on the boundary surfaces between flexible part s111 and substrate parts s112 without being fixed through an adhesive or the like. Preferably, substrate parts s112 easily slide on the boundary surfaces between flexible part s111 and substrate parts s112. Since substrate parts s112 are not fixed to flexible part s111, adhesive tape s113 for preventing substrate parts s112 from dropping from flexible part s111 is stuck so as to cover the cut ends of the slits in flexible part s111.

A reason for doing this is described with reference to FIG. 10A, FIG. 10B and FIG. 11.

FIG. 10A is a schematic sectional view showing the deformation state of substrate parts s112 and flexible part s111 when load F is applied from the upside in the state where substrate parts s112 are not fixed to flexible part s111. FIG. 10B is a schematic sectional view showing the deformation state of them when load F is applied from the upside in the state where substrate parts s112 are fixed to flexible part s111.

In FIG. 10A, similarly to the descriptions of FIG. 7A through FIG. 7D, when load F is applied from the upside (top drawing in FIG. 10A), surplus material part W of soft flexible part s111 is firstly compressed significantly (middle drawing in FIG. 10A). When a stronger force is applied in this state, the force that has not been completely absorbed by surplus material part W bends substrate parts s112, and flexible part s111 supports substrate parts s112 from their peripheries (bottom drawing in FIG. 10A). Since substrate parts s112 are bent and flexible part s111 is compressed and deformed, the deformation amounts of them on the boundary surfaces are different from each other. The difference between the deformation amounts is removed by deformation due to sliding and bending or compression of substrate parts s112 and flexible part s111. Therefore, it is preferable that they are not fixed and the boundary surfaces are slippery.

In FIG. 10B, substrate parts s112 are buried in flexible part s111 and fixed not to move on the boundary surface. When a load is applied from the upside (top drawing in FIG. 10B), flexible part s111 deforms proportionally with the load. Since the boundary surfaces between flexible part s111 and substrate parts s112 are fixed, substrate parts s112 deform in response to the compressed deformation amount of flexible part s111. Substrate parts s112 are made of not compressive material but elastically bending material, so that substrate parts s112 buckle (fold) and deform so as to be pulled by the boundary surfaces between them and flexible part s111 (middle drawing in FIG. 10B and bottom drawing in FIG. 10B). Therefore, the property of substrate parts s112 of elastically bending to absorb an impact is not exhibited, and only the function of increasing the hardness of flexible part s111 is exhibited.

FIG. 11 shows the relationship between load F and deformation amount ΔL when load F is applied from the upside to each of the following buffer members:
 buffer member (a) having only the flexible part;
 buffer member (b) having substrate parts s112 and flexible part s111, in which substrate parts s112 are buried in flexible part s111 and the boundary surfaces are stuck and fixed; and
 buffer member (c) having substrate parts s112 and flexible part s111, in which substrate parts s112 are inserted into the slits in flexible part s111 and the boundary surfaces are made slippery without being fixed.

Deformation amount ΔL increases substantially proportionally with load F on buffer member (a).

When load F is applied from the upside to buffer member (b), the deformation amount of flexible part s111 and substrate parts s112 is increased less than that of buffer member (a) proportionally with load F, and substrate parts s112 also bend so as to respond to compressive deformation of flexible part s111, because substrate parts s112 simply increase the hardness of flexible part s111. Substrate parts s112 rapidly deform and buckle (fold) at the point where the buckling material (corresponding to substrate parts s112) folds, as shown in the graph of FIG. 11. The deformation rate of substrate parts s112 is increased by buckling, deformation amount ΔL with respect to load F is apt to further increase comparing with that before buckling, and the increasing rate becomes substantially as large as that of buffer member (a).

When load F is applied from the upside to buffer member (c) of the present invention, surplus material part W of soft flexible part s111 is firstly compressed. Therefore, deformation amount ΔL is close to that of buffer member (a) formed of only the flexible part. When load F is further applied, the force that has not been completely absorbed by surplus material part W bends substrate parts s112, and flexible part s111 supports substrate parts s112 from their peripheries. Therefore, the deformation characteristic at this time is close to that of buffer member (b). Substrate parts s112 bend, but do not fold differently from buffer member (b), so that the deformation characteristic has a small curve shape. In the graph of the curved characteristic of buffer member (c) in FIG. 11, the region where surplus material part W (W part) absorbs weak impact and high-frequency vibration is surrounded by an ellipse.

In buffer member (c) of the present invention, substrate parts s112 bend, but the possibility of buckling thereof similarly to buffer member (b) is small, and substrate parts s112 recovers even after receiving a strong impact force without generating a buckling sign (creases). The buffer performance of substrate parts s112 recovers without changing. Therefore, without requiring replacement of the buffer member, the buffer member can instantly prepare for subsequent drop of the notebook PC or impact to it.

In other words, once substrate parts s112 buckle to generate creases, substrate parts s112 do not completely return to the original state even when buffer member s11 recovers, the essential buffer performance of substrate parts s112 cannot be kept, and hence substrate parts s112 cannot prepare for subsequent drop of the notebook PC or impact to it. Therefore, there is no other choice but to replace impact absorbing device 12 as a unit or to peel buffer member s11 for replacing it. As a result, when the possibility of buckling is large, this buffer member is hard to say preferable.

In the present embodiment, a relatively weak impact force is absorbed by surplus material part W of flexible part s111, and a stronger impact force that has not been completely absorbed by surplus material part W is absorbed by interaction between flexible part s111 and substrate parts s112. Therefore, impact absorbing device 12 can effectively buffer various impacts, namely from a strong impact occurring when a user accidentally drops the notebook PC to a weak daily impact occurring when the user puts the notebook PC on a desk and carries it with a bag.

The high-frequency impact on the case side occurring in falling is prevented from propagating to the HDD 11 side, and the buffer performance can be improved. Conversely, the vibration on the HDD 11 side under operation can be prevented from propagating to the case side.

By leaving surplus material part W in buffer member s11, the impact force absorbing capacity can be used without bending substrate parts s112 when impact absorbing device 12 is stored in the predetermined space in the notebook PC case. Impact absorbing device 12 can be stored stably and certainly without using a fixing means in the predetermined space in the notebook PC case.

Since substrate parts s112 are not fixed to flexible part s111, when a strong impact force is applied to flexible part s111, flexible part s111 is compressed and deformed and substrate parts s112 is bent to make the deformation amounts on the boundary surfaces thereof to be different from each other. This difference can be removed due to non-sticking of the boundary surfaces. Therefore, substrate parts s112 bend, but recover without generating a buckling sign by buckling. Therefore, without requiring replacement of the buffer member, the buffer member can instantly prepare for subsequent impact such as drop.

The present embodiment has been applied to only buffer member s11 of impact absorbing device 12, but may be applied to the other buffer members (buffer members s12 through s15 in FIG. 4) such as buffer member s12.

Second Exemplary Embodiment

The second exemplary embodiment of the present invention is similar to the first exemplary embodiment of the present invention in many respects. Therefore, elements similar to those in the first exemplary embodiment are denoted with the same reference marks, and the descriptions of those elements are omitted. Only different points between the first exemplary embodiment and second exemplary embodiment are described.

Figure 12:
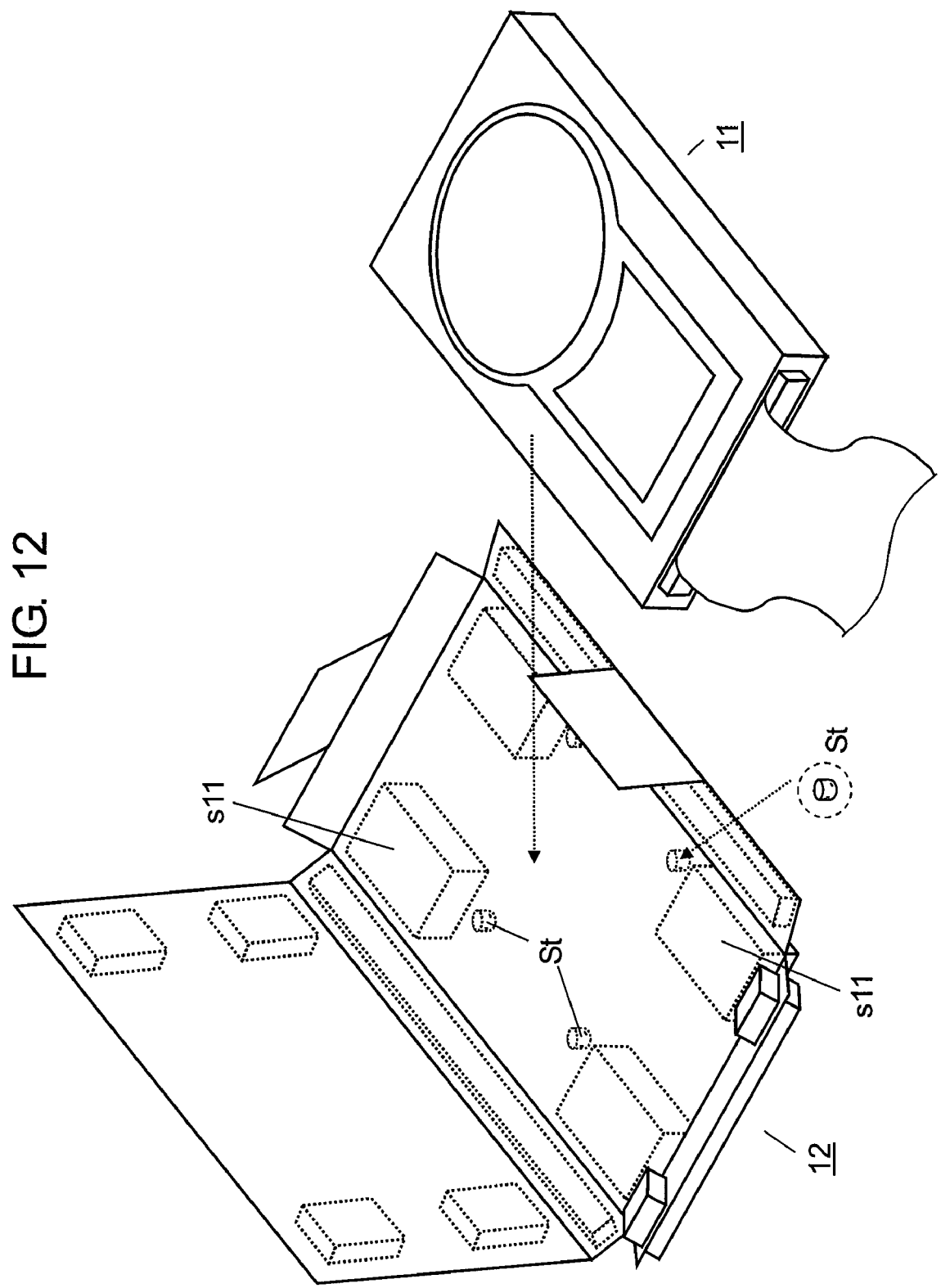
FIG. 12 is a schematic exploded perspective view of the HDD unit showing the HDD that is covered with and mounted in the impact absorbing device having the slit.
Figure 14:
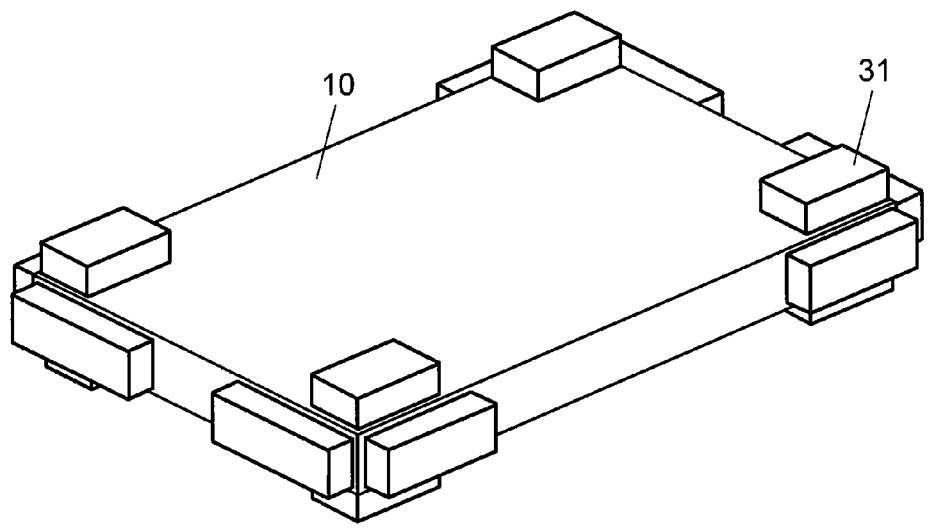
FIG. 14 is a schematic perspective view of an electronic apparatus built in via a conventional buffer member.
Figure 15:
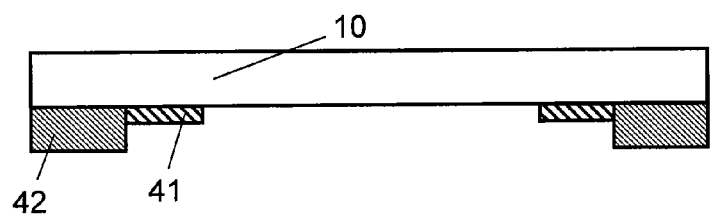
FIG. 15 is a schematic front view of a second example of the conventional buffer member.
Figure 16:
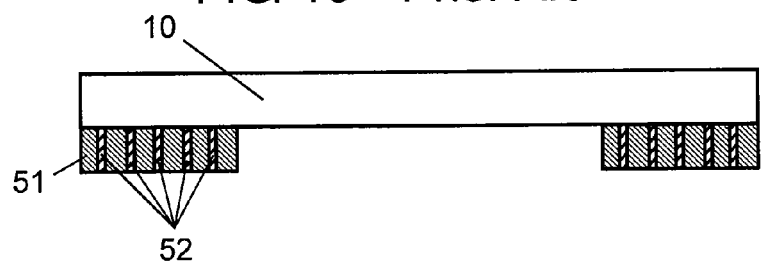
FIG. 16 is a schematic front view of a third example of the conventional buffer member.
Figure 17:
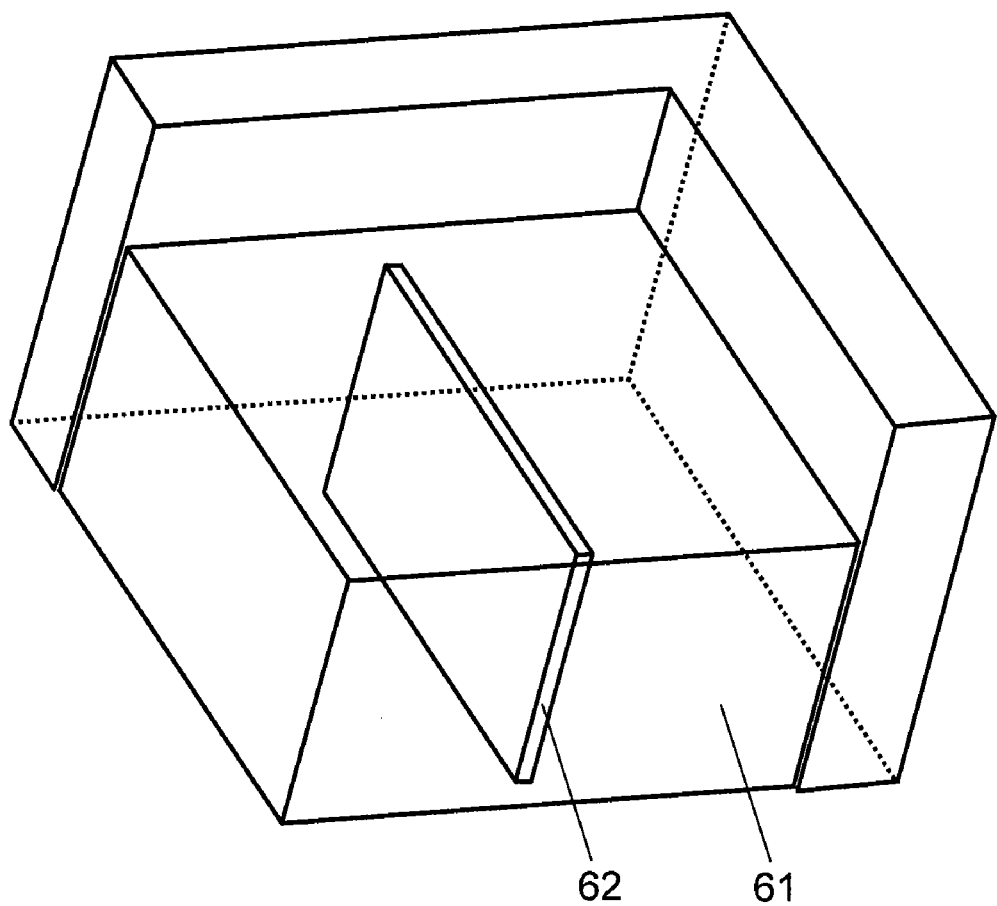
FIG. 17 is a schematic perspective view of a fourth example of the conventional buffer member.

FIG. 12 is a schematic exploded perspective view of an HDD unit showing an HDD that is covered with and mounted in an impact absorbing device.

FIG. 13A and FIG. 13B are schematic sectional views illustrating buffer operation performed when an impact is applied from the downside to impact absorbing device 12 storing HDD 11. This operation corresponds to the case where a notebook PC is dropped downward in FIG. 1.

The second exemplary embodiment differs from the first exemplary embodiment in that a protrusion St as a stopper is fixed to packing material (p) near a side of each buffer member s11 in the second exemplary embodiment.

As shown in FIG. 12, protrusion St is stuck to the proximity of a side of each buffer member s11 on packing material (p) forming impact absorbing device 12.

The upper drawing of FIG. 13B is a schematic sectional view of the HDD unit stored in the case before an impact is applied, has no stopper St, and corresponds to the first exemplary embodiment of the present invention.

When an extremely strong impact that is not be completely absorbed by substrate parts s112 is applied to buffer member s11, substrate parts s112 buckle to cause creases as shown in the lower drawing of FIG. 13B. Then, buffer member s11 is recovered by action of flexible part s111, but substrate parts s112 having the creases do not keep the original buffer performance.

While, the upper drawing of FIG. 13A is a schematic sectional view of the HDD unit stored in the case before an impact is applied, has stoppers St, and corresponds to the second exemplary embodiment of the present invention.

When an extremely strong impact that is not be completely absorbed by substrate parts s112 is applied to buffer member s11, the interval between impact absorbing device 12 and the notebook PC case is kept by height Lhst of stopper St as shown in the lower drawing of FIG. 13A. Therefore, substrate parts s112 do not buckle to the point of causing creases, buffer member s11 keeps the original buffer performance after recovery and can prepare for a subsequent impact such as drop.

At this time, height Lhst of stopper St is in the range of "Lw+<Lhst<L", and is set to be sufficiently smaller than length L so that substrate parts s112 do not buckle to the point of causing creases in the state shown in the lower drawing of FIG. 13A.

Here, Lhst is the height of stopper St, L is the length (distance) between the end of the notebook PC case on which buffer member s11 abuts and the surface of packing material (p) to which buffer member s11 is stuck, and Lw' is the size (thickness) of surplus material part W formed when impact absorbing device 12 is stored in the notebook PC case (after compression).

In the second embodiment, since stopper St is mounted to packing material (p) near a side of each buffer member s11, substrate parts s112 do not buckle to the point of causing creases even when an extremely strong impact is applied that is not completely absorbed by substrate parts s112 of buffer member s11, buffer member s11 keeps the original buffer performance after recovery and can prepare for a subsequent impact such as drop.

The buffer member of the present invention has an effect of buffering various impacts, namely from a strong impact occurring when a user accidentally drops the notebook PC to a weak daily impact occurring when the user puts the notebook PC on a desk and carries it with a bag. The buffer member is useful as an impact absorbing device for protecting a hard disk drive against the impact by the drop of a mobile information apparatus having the hard disk drive, and as a buffer member used in an impact absorbing device.

What is claimed is:

1. A buffer member of a disk drive comprising:
   a first buffer material deforming compressively, and cushioning;
   a slit formed in one side of the first buffer material, leaving a surplus material part, from a side of the first buffer material opposite to the one side; and
   a sheet-like second buffer material inserted into the slit, for absorbing by flexion an impact force stronger than a compressive deformation applied to the surplus material part;
   wherein a device to be protected is in contact with the surplus material part.

2. The buffer member of claim 1,
   wherein the number of slits is one or more, and the slits are formed in parallel at substantially regular intervals when the number of slits is plural.

3. The buffer member of claim 1,
   wherein the second buffer material is inserted into the slits formed in the first buffer material, and the second buffer material is mounted slidably on the boundary surface between the first buffer material and the second buffer material.

4. The buffer member of claim 1,
   wherein adhesive tape for preventing the second buffer material from dropping is stuck to a cut end of the first buffer material slotted from the one surface.

5. The buffer member of claim 1,
   wherein slot depth forming the slits is equal to or longer than length of a side corresponding to the slot depth of the second buffer material.

6. An impact absorbing device comprising:
   a first buffer material deforming compressively, and cushioning;
   a slit formed in one side of the first buffer material, leaving a surplus material part, from a side of the first buffer material opposite to the one side; and
   a flexible sheet-like second buffer material inserted into the slit, thereby composing a buffer member,
   wherein a device to be protected from external impact force is in contact with the surplus material part.

7. The impact absorbing device of claim 6,
   wherein the buffer member is stuck to the surface of a packing material corresponding to a surface of the stored device through adhesive double coated tape, the surface being weak to an impact.

8. The impact absorbing device of claim 6,
   wherein a protrusion as a stopper is fixed to a packing material near a side of the buffer member.

9. The impact absorbing device of one of claim 6, wherein the impact absorbing device is mounted to a mobile information apparatus, and
   either or both of relationships A<L<A+Lw and ΔLw/Lw<0.3 are established, wherein A is length of a side corresponding to slot depth forming the slits in the second buffer material, L is length (distance) between a case end of the mobile information apparatus on which the impact absorbing device abuts and a surface of the impact absorbing device, Lw is size (thickness) of the surplus material part before the impact absorbing device is mounted (compressed) to the mobile information apparatus, and ΔLw is (A+Lw)−L, namely compressed size (thickness) of the surplus material part when the impact absorbing device is stored in a case of the mobile information apparatus.

10. A mobile information apparatus comprising the impact absorbing device of one of claim 6.

11. A mobile information apparatus comprising the impact absorbing device of claim 9.

12. The impact absorbing device of claim 7, wherein the impact absorbing device is mounted to a mobile information apparatus, and either or both of relationships A<L<A+Lw and ΔLw/Lw<0.3 are established, wherein A is length of a side corresponding to slot depth forming the slits in the second buffer material, L is length (distance) between a case end of the mobile information apparatus on which the impact absorbing device abuts and a surface of the impact absorbing device, Lw is size (thickness) of the surplus material part before the impact absorbing device is mounted (compressed) to the mobile information apparatus, and ΔLw is (A+Lw)−L, namely compressed size (thickness) of the surplus material part when the impact absorbing device is stored in a case of the mobile information apparatus.

13. The impact absorbing device of claim 8, wherein the impact absorbing device is mounted to a mobile information apparatus, and either or both of relationships A<L<A+Lw and ΔLw/Lw<0.3 are established, wherein A is length of a side corresponding to slot depth forming the slits in the second buffer material, L is length (distance) between a case end of the mobile information apparatus on which the impact absorbing device abuts and a surface of the impact absorbing device, Lw is size (thickness) of the surplus material part before the impact absorbing device is mounted (compressed) to the mobile information apparatus, and ΔLw is (A+Lw)−L, namely compressed size (thickness) of the surplus material part when the impact absorbing device is stored in a case of the mobile information apparatus.

14. A mobile information apparatus comprising the impact absorbing device of claim 7.

15. A mobile information apparatus comprising the impact absorbing device of claim 8.

16. A mobile information apparatus comprising the impact absorbing device of claim 12.

17. A mobile information apparatus comprising the impact absorbing device of claim 13.

* * * * *